United States Patent
Baechle

(10) Patent No.: US 8,944,238 B2
(45) Date of Patent: Feb. 3, 2015

(54) TRANSPORT DEVICE

(75) Inventor: Andreas Baechle, Rickenbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/997,026

(22) PCT Filed: Dec. 14, 2011

(86) PCT No.: PCT/EP2011/072785
§ 371 (c)(1),
(2), (4) Date: Jun. 21, 2013

(87) PCT Pub. No.: WO2012/084648
PCT Pub. Date: Jun. 28, 2012

(65) Prior Publication Data
US 2013/0299316 A1    Nov. 14, 2013

(30) Foreign Application Priority Data
Dec. 21, 2010   (DE) .................. 10 2010 063 741

(51) Int. Cl.
*B65G 37/00* (2006.01)
*B65G 17/12* (2006.01)
*B65G 17/48* (2006.01)
*B65G 19/02* (2006.01)

(52) U.S. Cl.
CPC ............ *B65G 17/12* (2013.01); *B65G 17/485* (2013.01); *B65G 19/025* (2013.01)
USPC .................. 198/577; 198/465.1; 104/106

(58) Field of Classification Search
USPC ............ 198/685, 710, 711, 465.1, 465.4; 104/106, 172.4, 91, 107, 109, 111, 244
See application file for complete search history.

(56) References Cited

U.S. PATENT DOCUMENTS

| 1,526,853 | A |   | 2/1925  | Harson |
|-----------|---|---|---------|--------|
| 3,875,868 | A | * | 4/1975  | Martin, Jr. ............ 104/244 |
| 3,922,970 | A | * | 12/1975 | Glastra ................. 104/91 |
| 5,172,791 | A | * | 12/1992 | Couvrette ............. 186/37 |
| 5,709,375 | A |   | 1/1998  | Klopfenstein |
| 5,738,016 | A | * | 4/1998  | Scott .................... 104/107 |
| 6,070,534 | A | * | 6/2000  | Lehrieder ............. 104/172.3 |

FOREIGN PATENT DOCUMENTS

DE   102006007822 A1   10/2007
EP       0254273 A1    1/1988
(Continued)

OTHER PUBLICATIONS

International Search Report for Application No. PCT/EP2011/072785 dated Mar. 16, 2012 (2 pages).

*Primary Examiner* — William R Harp
(74) *Attorney, Agent, or Firm* — Michael Best & Friedrich LLP

(57) ABSTRACT

A closed transport track, includes two tubular or rod-shaped guide rails (12, 14), which are arranged parallel to and substantially vertically on top of each other. At least one transport module (10) is connected to each guide rail (12, 14) via at least one support roll pair (46, 48), wherein the rolls of each support roll pair (46, 48) can be rotated about roll axes (a) which are substantially perpendicular to a guide rail axis (x) and include an angle of less than 180° and the rolls are seated against one of the guide rails (12, 14) in a detent position. The support roll pairs (46, 48) are non-positively seated against the guide rails (12, 14) via at least one force element (40), which acts on the support roll pairs (46, 48).

23 Claims, 5 Drawing Sheets

(56) References Cited

FOREIGN PATENT DOCUMENTS

| | | |
|---|---|---|
| EP | 0656304 A | 6/1995 |
| EP | 0834460 A2 | 4/1998 |
| EP | 1215122 A | 6/2002 |
| GB | 2148827 A | 6/1985 |
| WO | 96/07592 A | 3/1996 |
| WO | 2009/077250 A | 6/2009 |

* cited by examiner

TRANSPORT DEVICE

BACKGROUND OF THE INVENTION

The invention relates to a device for transporting objects along a closed transport track, comprising, as the transport track, two tubular or rod-shaped guide rails, which are arranged parallel to and substantially vertically on top of each other. At least one transport module is connected to each guide rail via at least one support roll pair, wherein the rolls of each support roll pair can be rotated about roll axes which are substantially perpendicular to a guide rail axis and include an angle of less than 180° and the rolls are seated against one of the guide rails in a detent position. The device is equipped with a drive means which is arranged so as to rotate substantially parallel to the guide rails and which can be connected to the at least one transport module.

The invention relates to a container conveyor as is frequently used in cartoners. Containers of different sizes are processed in said cartoners by said containers as a rule being shaped, filled, closed and sent on to further production equipment, for example to a palletizer. The most widely varying products from, inter alia, the food, pharmaceutical and health care industry are packaged in such machines. In so doing, different container sizes have to be transported with the container conveyor.

The European patent application EP-A-1 215 122 discloses a container conveyor consisting of two parallel toothed drive belts comprising driving dogs, between which the containers are clamped and transported. Upright cartons have to thereby be fed into the transport process via a clock pulse, which time and again leads to malfunctions. The number of containers in transport is fixed due to the regular spacing of the driving dogs, which greatly limits output particularly in the case of small container sizes. This type of conveyor can only be used for filling the containers on account of the lateral access being limited when setting the cartons upright and closing the same.

The WIPO patent application WO-A-96/07592 discloses a carton transport device for different carton sizes, comprising three parallel conveyor belts having in each case driving dogs fixed thereon. The transport device can be adjusted for different size cartons in all three dimensions. A substantial disadvantage thereto is the complex mechanical construction of this system and the costs resulting therefrom. The rigid separation of the containers according to size leads to a less flexible system having a fixed number of containers in transport which is independent of the size of the cartons. In addition, tools are required for adjusting the three conveyor belts in relation to one another. As a result, an adjustment at the beginning of the production is likewise again required, which leads to substantially longer times for the renewed start-up of production.

The container conveyor known from the WIPO patent application WO-A-2009/077250 is designed as a horizontal rotary conveyor, in which transport modules are fixed to a horizontally rotating chain. Cartons placed on said transport modules are conveyed through the plant and processed at different stations. Only a limited format range (carton sizes) can be covered by the transport modules which are fixedly mounted to the driving means. The construction is not suited to being carried out without the use of tools for the mounting and dismounting of the transport modules which is required for the frequent format changes.

A device of the kind mentioned above is disclosed in the European patent application EP-A 0 656 304. In this transport system, transport modules driven by means of a chain are mounted on two parallel guide rails. A substantial disadvantage to this system is that the transport modules cannot be easily exchanged. The transport modules placed onto the guide rails are fastened by means of a screw connection and have to be readjusted after each mounting.

SUMMARY OF THE INVENTION

The aim underlying the invention is to develop transport modules for a transport system of the kind mentioned above, which can be very easily mounted and dismounted without tools, which automatically compensate for manufacturing tolerances and are also thereby resistant to wear. A further aim of the invention is the automatic compensation for irregularities in the guide rails. The renewed start-up of production after exchanging transport modules should occur in the shortest time as possible. The transport modules should thus be able to be employed without subsequent adjustment.

The aim of the invention is met by virtue of the fact that the support roll pairs are non-positively seated against the guide rails via at least one force element, which acts on said support roll pairs and generates a directed force, and by virtue of the fact that at least one of said support roll pairs seated against differing guide rails can be pushed out of the detent position with the guide rail against the acting direction of the force of the force element.

The roll axes of the rolls of the support roll pairs preferably include substantially an angle of 90°, and said support roll pairs are preferably mounted to the transport module so that they can rotate about axes which are perpendicular to the guide rail axis and parallel to the vertical axis. By the term "substantially", an angular deviation of less than 5° is thereby understood. The axes of the support roll pairs which are perpendicular to the guide rail axis and parallel to the vertical axis do not necessarily have to lie along the same axis but can also display a parallel displacement.

The support roll pairs seated against differing guide rails are preferably arranged between the guide rails. In so doing, the force exerted by the force element onto one of the support roll pairs is directed away from the force exerted by said force element onto the other support roll pair.

The guide rails can, however, also be arranged between the support roll pairs seated against differing guide rails. In this case, the force exerted by the force element onto one of the support roll pairs is directed towards the force exerted by said force element onto the other support roll pair.

In an expedient embodiment, the transport module has a vertical module comprising support roll pairs which are arranged on two sides and associated with two differing guide rails.

Each of the support roll pairs associated with two differing guide rails can be connected via a respective force element. The module carrier can alternatively consist of two carrier parts connected via a force element.

At least one entrainment cam which can be brought into engagement with the drive means, preferably a toothed drive belt, is arranged in a preferable manner on the transport module.

Because the distance between the entrainment cam attached to the transport module and the drive means is smaller in a curved segment than in a linear segment, the entrainment cams have to be embodied long enough and in any case be able to penetrate the driving means. The entrainment cam is preferably resiliently attached to the transport module. In so doing, the distance which is subject to change between transport module and drive means can be compensated.

The at least one entrainment cam can therefore preferably be displaced in relation to the transport module substantially perpendicularly to the drive means and be brought into engagement with the drive means via at least one force element. In contrast to connecting the transport modules to the drive means via a screw connection, this embodiment facilitates a simple, one-sided decoupling or unhooking of the transport modules from the drive means. In the case of an overload, the cam can decouple from the drive means. This action can prevent damage to the mechanical system.

The drive means which is arranged so as to rotate can, for example, be a rotating chain or in particular a toothed drive belt. In a particularly preferable manner, the drive means which is arranged so as to rotate can also be embodied as a rotatably disposed stator of a linear motor. Other drive means familiar to the person skilled in the art are, however, also conceivable.

By the term "connectable", it should be understood in this context that the transport means can be connected non-positively and/or positively to the drive means. The connection can result from a mechanical coupling and/or in particular from a magnetic coupling.

In order to compensate for the smaller distance between the at least one entrainment cam and the drive means in a curved segment vis-a-vis a linear segment of a rotary conveyor, the center of the drive means can be displaced with respect to the center of the guide rails by a certain amount away from the curved segment. This displacement can particularly occur parallel to the angle bisector or center parallel of the linear segments which adjoin the curved segment. An additional compensation can take place by means of the aforementioned, resilient attachment of the entrainment cams to the transport module. The distance which varies between transport module and drive means can thus be optimally compensated.

The aforementioned resilient entrainment cams are preferably disposed in pairs adjacent to one another. Said entrainment cams disposed in pairs adjacent to one another can thereby be in turn disposed in pairs on top of each other so that in total four entrainment cams are enabled. Said entrainment cams disposed on top of each other can engage, for example, with two drive belts, such as toothed drive belts, disposed on top of each other.

Respectively at least two, preferably exactly two, entrainment cams are enabled per mesh point with the drive means. A reliable engagement is thereby achieved at the desired location at the drive means.

Further advantages of the invention are:
shorter downtimes when cleaning the transport modules by means of a simple and fast exchange of said modules,
shorter downtimes during format changes, i.e. change of the transport modules to differing container sizes to be transported,
no tools and no adjustment are necessary when exchanging the transport modules,
compensation for manufacturing irregularities and wear.

BRIEF DESCRIPTION OF THE DRAWINGS

Further advantages, features and details of the invention ensue from the following description of preferred exemplary embodiments as well as with the aid of the drawings which is only used for explanation and is not to be interpreted restrictively. The drawings show schematically in.

DETAILED DESCRIPTION

Figure 1:
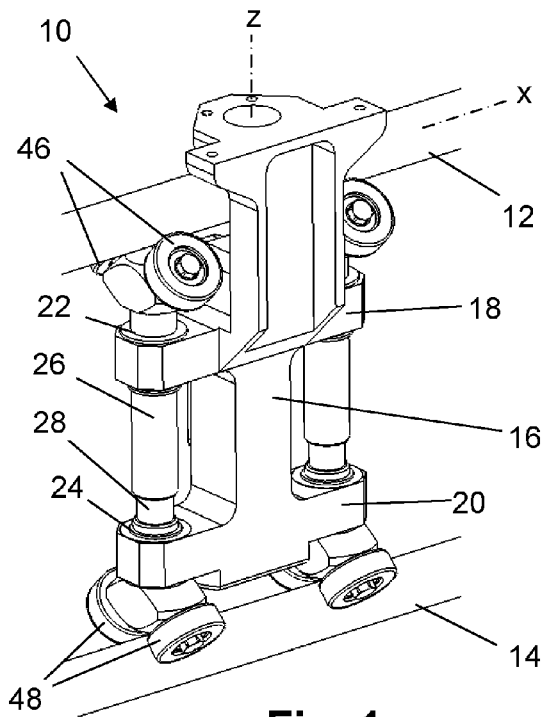
FIG. 1 an oblique view of a part of a rotary conveyor system comprising a transport module arranged on guide rails.
Figure 2:
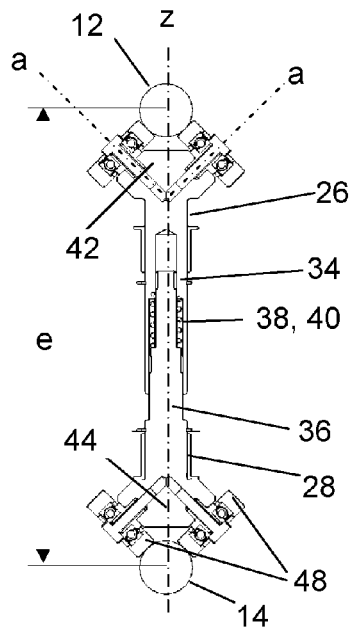
FIG. 2 a section through the roll system of the transport module from FIG. 1, said section being set at a right angle to the guide rails.
Figure 3:
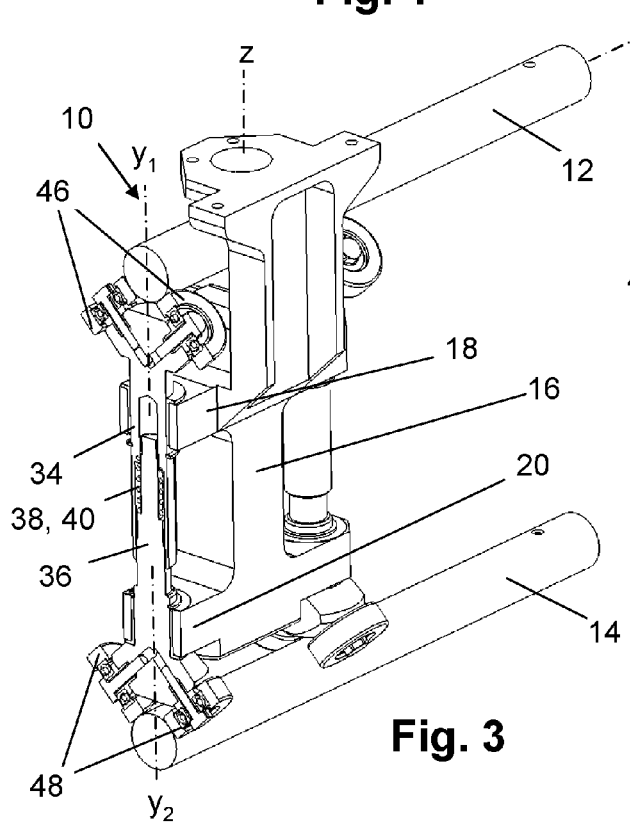
FIG. 3 the oblique view from FIG. 1 comprising the section through the roll system pursuant to FIG. 2.

A transport module 10 reproduced in FIGS. 1 to 5 is engaged with two guide rails 12, 14 of a rotary conveyor system of a packaging machine, which is not illustrated in detail here. The guide rails 12, 14 are arranged parallel to and on top of each other and are spaced apart from one another at a distance e. Said guide rails 12, 14 are rods or pipes with a circular outer cross-section. Guide rails having another suitable outer cross-section are also conceivable. The transport module 10 includes a central, vertically disposed module carrier 16 comprising carrier parts 18, 20 projecting in pairs laterally and horizontally therefrom, said carrier parts being furnished with guiding ducts 22, 24 for receiving vertically disposed upper and lower supports 26, 28 for upper and lower support roll pairs 46, 48. The upper support 26 overlaps a stepped, cylindrical shaft part 36 of the lower support 28 with a stepped, hollow-cylindrical shaft part 34 while forming a hollow space 38 that is annular in cross-section. A spiral coiled spring 40, which overlaps the stepped part of the cylindrical shaft part 36 of the lower support 28, is disposed in the hollow space 38. The spiral coiled spring 40 is seated at one end against the upper support 26 and at the other end against the lower support 28. Each support 26, 28 ends in the form of a head part 42, 44 at an end opposite to the shaft part 34, 36, said head part including the upper and lower support roll pair 46, 48 arranged thereon.

The rolls of each support roll pair 46, 48 are mounted on roll axes a which are at a right angle to each other and project from the head part 42, 44. The supports 26, 28 are mounted in the cylindrical guiding ducts 22, 24 in the horizontally projecting carrier parts 18, 20 and also so as to be rotated relative to each other about a vertical axis z.

When the transport module 10 is in the inserted position, the rolls of each support roll pair 46, 48 are situated between the two guide rails 12, 14 and are seated against the guide rails 12, 14 from the inside. The diameter and the spatial position of the rolls of the support roll pairs 46, 48 are matched to the outside diameter of the guide rails 12, 14 such that the running surfaces of the rolls of the support roll pairs 46, 48 are perpendicular to a diametrical plane of the guide rails 12, 14. The spiral coiled spring 40 is preloaded under pressure with a sufficient force; thus enabling the transport module 10 on the one hand to be held sufficiently stable by the support roll pairs 46, 48 disposed between the guide rails 12, 14 and to be secured against an unintended decoupling and on the other hand to be engaged between the guide rails 12, 14 without excessive force being applied by the hand of the operator and to again be removed from the same by the operator lifting the transport module and rotating it out of the guide rails from below.

Figure 4:
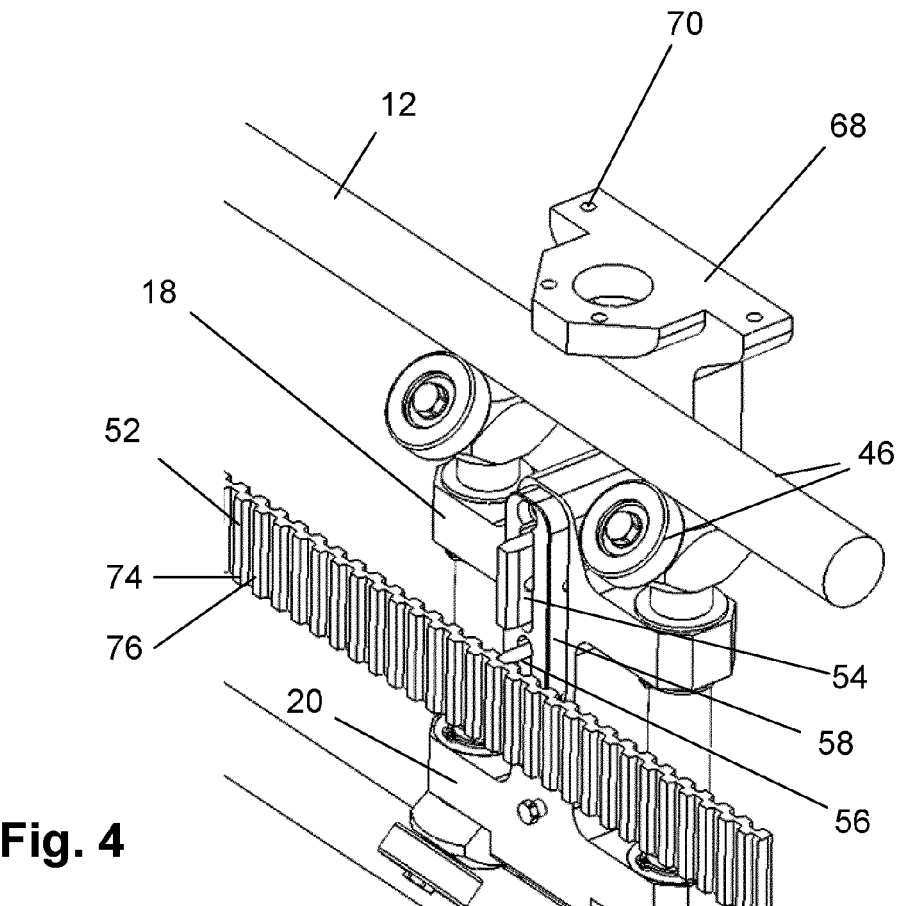
FIG. 4 an oblique view of the drive side of the arrangement from FIG. 1.

In order to propel the transport module 10, provision is made pursuant to FIG. 4 for a toothed drive belt 52, which is disposed parallel to the guide rails 12, 14 and is connected to a drive that is not depicted in the drawing. Two entrainment cams 54, 56 disposed vertically on top of each other are arranged on the module carrier 16. In the example shown, the lower entrainment cam 56 is engaged with the toothed drive belt 52. The upper entrainment cam 54 is intended for an engagement with a second toothed drive belt, which is not depicted in the drawing, and then, for example, goes into action if the transport speed of the transport module 10 is to be changed at a location of the rotary conveyor system. This change in speed of the transport module can result, for example, by means of the second toothed drive belt being driven slower than the first toothed drive belt 52.

Figure 5:
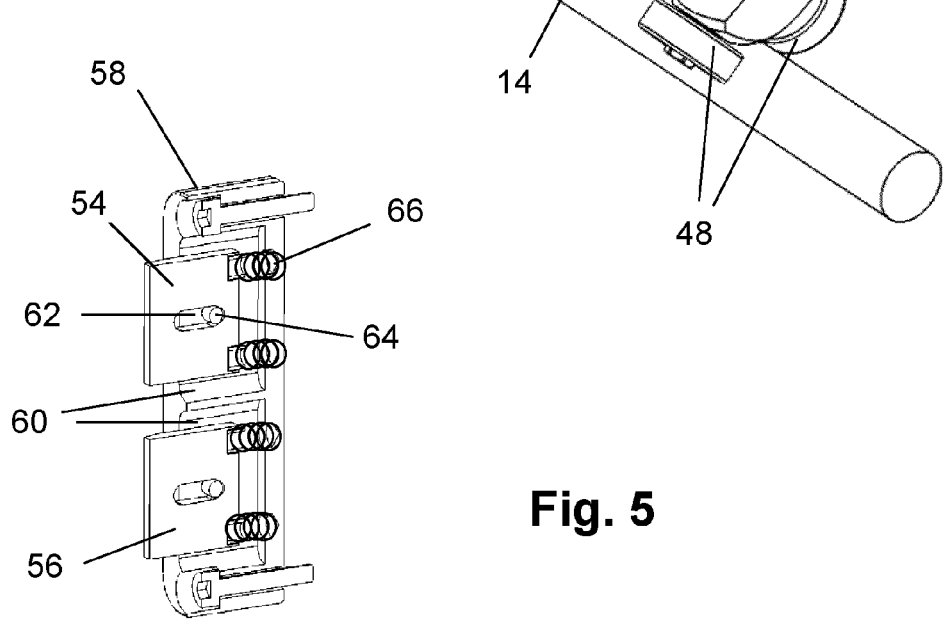
FIG. 5 an oblique view of the partially sectioned entrainment means of the arrangement from FIG. 4.

The entrainment cams 54, 56 are disposed in a housing 58 which is furnished with opening slots 60 and which is fixed to the module carrier 16. Said entrainment cams 54, 56 have an oblong hole 62 which extends horizontally and in which a stud 64 fixed to the housing 58 engages. Spiral coiled springs 66 preloaded under pressure are disposed between the back wall of the housing 58 and the back side of the entrainment cams 54, 56, said springs pushing the entrainment cams 54, 56 away from the module carrier 16 in the direction of the toothed drive belt 52 (FIG. 5).

The toothed drive belt 52 is arranged with respect to the guide rails 12, 14 such that the entrainment cam 54 is always in engagement with said toothed drive belt 52, wherein the distance between said toothed drive belt 52 and the transport module 10 is adjusted in such a manner that while being engaged with said toothed drive belt 52, the entrainment cam 54 lies within the tolerance range predetermined by the end stops of the oblong hole 62 across the entire rotary conveyor system.

Figure 6:
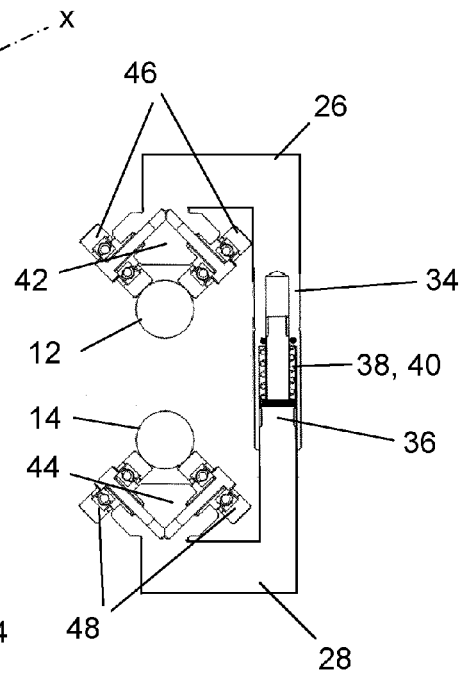
FIG. 6 a section through an alternative roll system of the transport module pursuant to FIG. 1, said section being set at a right angle to the guide rails.

In the variant to the roll system for a transport module 10 pursuant to FIG. 1, which is depicted in FIG. 6, the guide rails 12, 14 are disposed between the rolls of each support roll pair 46, 48 and are seated against the guide rails 12, 14 from the outside in the inserted position of the transport module 10. As is the case in the embodiment shown in FIG. 2, the diameter and the spatial position of the rolls of the support roll pairs 46, 48 are matched to the outside diameter of the guide rails 12, 14 such that the running surfaces of the rolls of the support roll pairs 46, 48 are perpendicular to a diametrical plane of the guide rails 12, 14. The spiral coiled spring 40 is connected here at one end to the upper support 26 and at the other end to the lower support 28 and is preloaded under tension with a sufficient force such that the transport module 10 is held on the one hand sufficiently stable on the guide rails 12, 14 by the support roll pairs 46, 48 together with said guide rails 12, 14 that are disposed between the same and is secured against an unintended decoupling. On the other hand, said transport module 10 can be engaged across the guide rails 12, 14 and removed from the same without excessive force being applied by the hand the operator.

Figure 7:
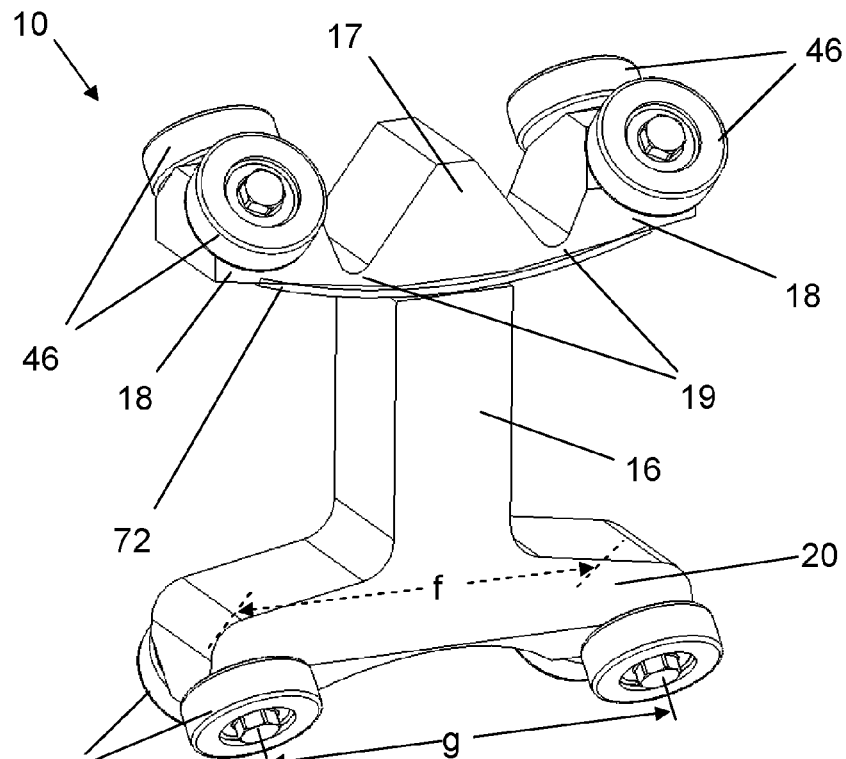
FIG. 7 an oblique view of a transport module comprising a further roll system which has rolls offset towards the inside and an alternative spring system (leaf springs)

In the transport module 10 depicted in FIG. 7, the lower support roll pairs 48 are fixedly mounted to the lower carrier parts 20 of the module carrier 16. The spacing f of the inner rolls can be reduced with respect to the spacing g of the outer rolls. The rolls are thereby also well guided when the arrangement thereof on the lower carrier part 20 is tight. The upper carrier parts 18 are manufactured from an elastic material and comprise a region 19 of less material thickness opposite to a central part 17. The spring effect is produced by the elastic material. It is also alternatively possible to produce the spring effect by means of a supporting elastic element. The upper carrier parts 18 are fixed to the module carrier via the central part 17 and a spring plate 72 is placed underneath said upper carrier parts 18. The spring plate 72 is preloaded under pressure with a sufficient force in the inserted position of the transport module 10 so that said transport module 10 is kept on the one hand sufficiently stable between the guide rails 12, 14 by the support roll pairs 46, 48 disposed between said guide rails 12, 14 and is secured against unintended decoupling, and on the other hand can be engaged between the guide rails 12, 14 and removed from the same without excessive force being applied by the hand of the operator.

Figure 8:
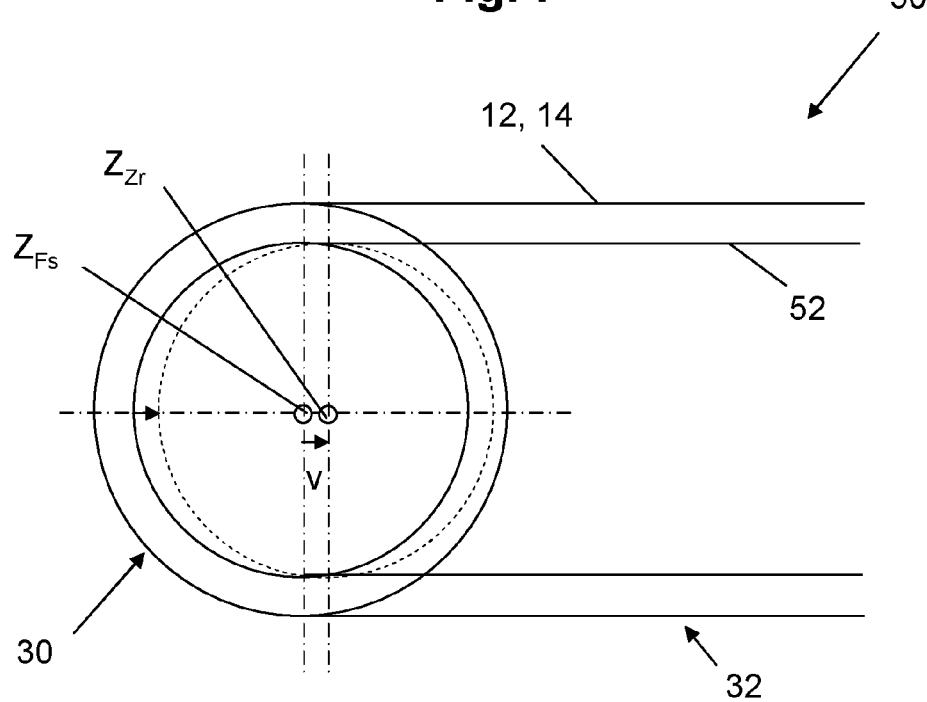
FIG. 8 a variant of the relative position of the guide rails with respect to the drive means in a curved region.

In a curved segment 30 of a rotary conveyor system 50, the distance between the entrainment cam 56 attached to the transport module 10 and the toothed drive belt 52 is less than in a linear segment 32. Because the entrainment cam 56 is resiliently attached to the transport module 10, the varying distance between transport module 10 and toothed drive belt 52 is continually compensated. In order to keep this compensation travel within limits and to minimize a negative effect on the accuracy of the system due to the enlarged leverage effect of too long an entrainment cam, the following action can be taken in the curved segment 30, in which action the center $Z_{Zr}$ of the toothed drive belt is displaced with respect to the center $Z_{Fs}$ of the guide rails 12, 14 pursuant to FIG. 8 parallel to an adjacent linear segment 32 by a specific displacement amount v away from the curved segment 30. In so doing, the distance of the transport module 10 to the toothed drive belt 52 in the curved segment 30 of the rotary conveyor system 50 is approximately equal to the distance of the transport module 10 to the toothed drive belt 52 in the linear segment 32.

As a function of the type, configuration, size and if required further parameters of the objects provided for transport, a suitable receiving area is mounted on the transport module. In the transport module 10 depicted in the drawings, a mounting plate 68 furnished with boreholes 70 is provided for mounting a receiving area to the central module carrier 16.

Figure 9:
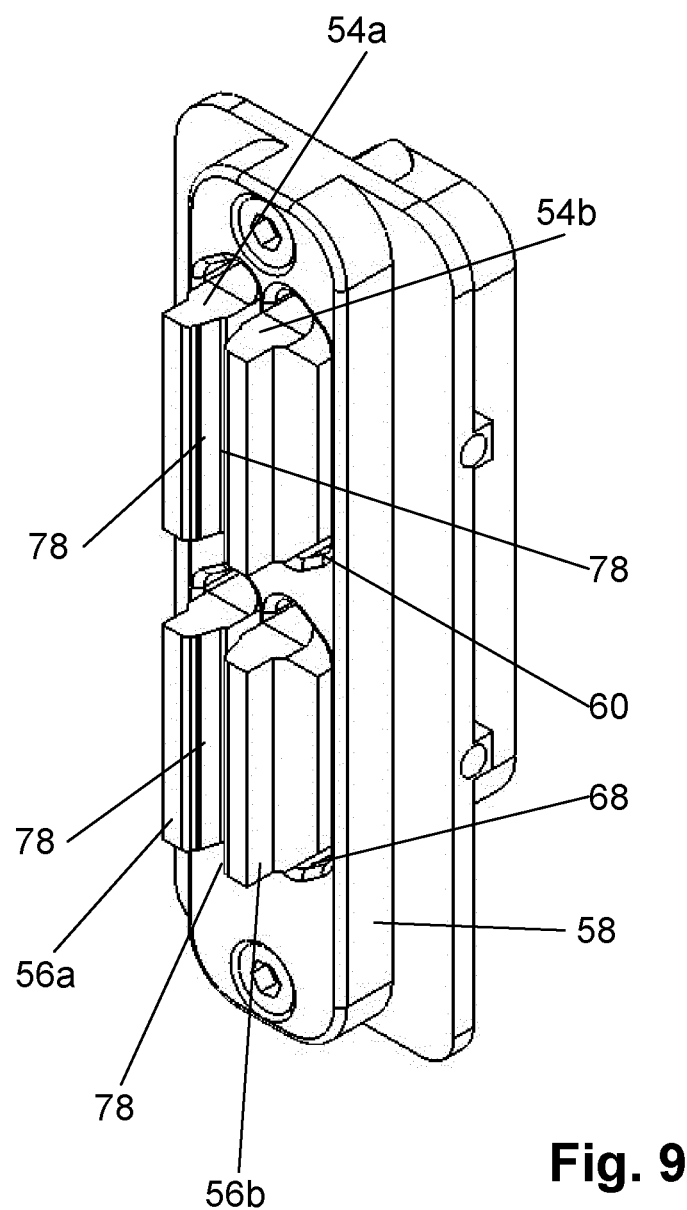
FIG. 9 a perspective view of an embodiment of entrainment cams for use in the entrainment means depicted in the other figures.
Figure 10:
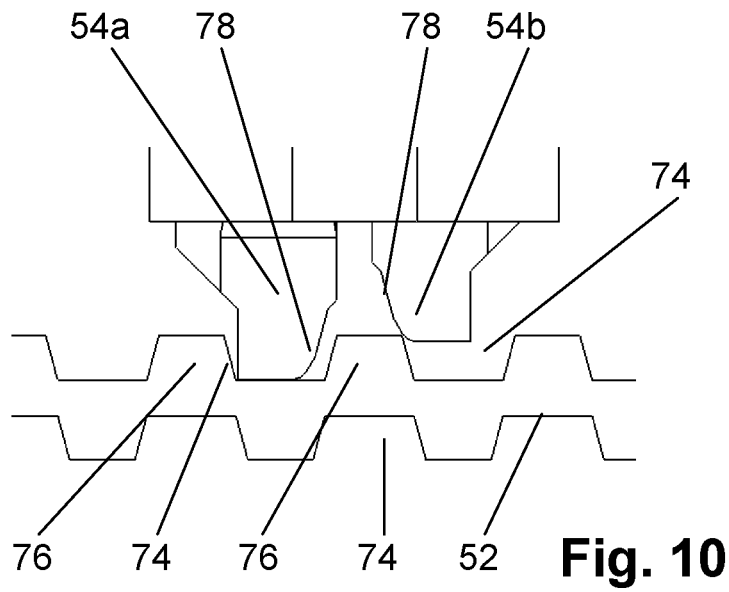
FIG. 10 a schematic view from above of the entrainment cam pursuant to FIG. 9.
Figure 11:
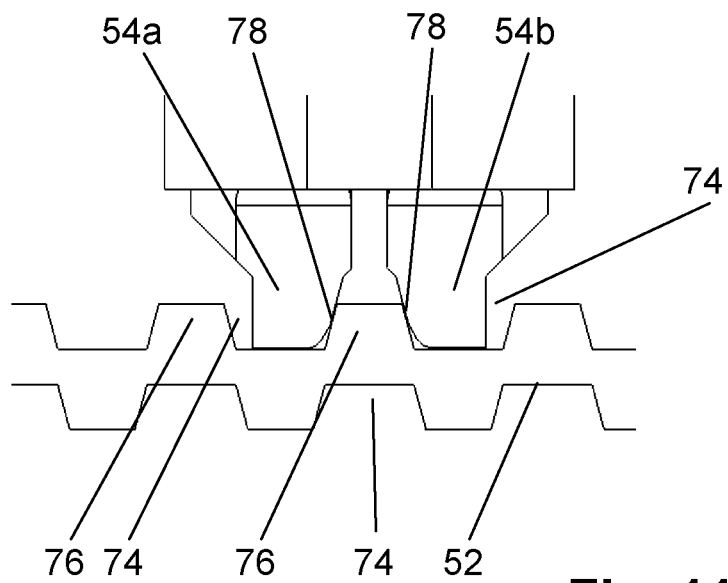
FIG. 11 a schematic view from above of the entrainment cam pursuant to FIGS. 9 and 10.

A particularly advantageous embodiment of the entrainment cams 54, 56 is shown in reference to FIGS. 9 to 11. The entrainment cams 54, 56 are in this case arranged in pairs adjacent to one another. It can therefore be said that the entrainment cams are enabled in pairs for each mesh point with the drive means, in this case with the toothed drive belt 52. Each of the entrainment cam pairs 54, 56 thereby comprises two entrainment cams 54a, 54b and 56a, 56b arranged side by side. The entrainment cams shown in the aforementioned FIGS. 9 to 11 have basically the same features as those entrainment cams depicted in the preceding figures, in particular the entrainment cams depicted in FIGS. 4 and 5.

In applications, where the transport modules are transferred to the next station by means of a toothed drive belt 52, problems can arise when only one single entrainment cam is used. If the tooth gap of the succeeding drive belt is missed when only one entrainment cam is present, the entrainment cam then rests on the tooth of the drive belt and can slip as it is not properly fixed. This is not critical in many applications; however, precisely in those situations where a high degree of accuracy and process reliability are required, the arrangement in pairs is very advantageous. The entrainment cams 54a, 54b or, respectively, 56a, 56b have the advantage that a particularly good and most importantly exact engagement in a specific tooth gap 74 or, respectively, in a specific tooth gap pair 74 of a toothed drive belt 52 can be provided. In other words, an arrangement is preferred comprising two entrainment cams 54a, 54b or, respectively, 56a, 56b, which are spring-loaded independently of one another using resilient means or more specifically spiral coiled springs 66.

With regard to the design of the drive means in the form of a toothed drive belt, it is clear from the figures that said toothed drive belt has a plurality of alternating tooth gaps 74 and teeth 76. In each case, two adjacent teeth 76 thereby delimit one tooth gap 74.

An embodiment is advantageous in which the entrainment cam 54a, 54b or, respectively, 56a, 56b is narrower than the tooth gap 74 of the toothed drive belt as viewed in the direction of rotation. It is thereby ensured that in the case of major irregularities (during the transfer of transport module), at least one of the two entrainment cams is reliably engaged in the toothing or more specifically in the tooth gap 74 of the toothed drive belt and that the transport module is therefore unambiguously positioned. This can be seen clearly in FIG. 10, the entrainment cam 54a being in this case in connection with the toothed drive belt 52. The entrainment cam 54b abuts in this instance the tooth 76 of the drive belt 52. Nevertheless, it is ensured here that one of the two entrainment cams, in this instance cam 54a, engages in the corresponding tooth gap 74 and therefore a transmission of force from the drive belt 52 to the entrainment cams can take place.

As is shown in FIG. 9, the entrainment cams 54a, 54b, 56a, 56b, which are arranged in pairs adjacent to one another can thereby in turn be arranged in pairs on top of each other so that in total four entrainment cams 54a, 54b, 56a, 56b are enabled.

The entrainment cams 54a, 54b or 56a, 56b furthermore have each at least one chamfer 78. The chamfer 78 assists in positioning the corresponding cam. A force from the cam abutting the tooth 76, here the cam 54b, is provided by the resilient means 66; thus enabling the entrainment cams 54a, 54b or, respectively, 56a, 56b to displace relative to the toothed drive belt 52, whereby it can be ensured that the two entrainment cams 54a, 54b or 56a, 56b which are arranged in pairs and adjacent to one another can engage in the corresponding tooth gaps 74. This is shown in FIG. 11. In other words, it can be said that the transport module pushes itself into the correct position on the drive belt by means of the chamfer 78 on the entrainment cam 54b that is not yet situated in engagement with the drive belt 52; thus enabling both entrainment cams 54a and 54b to project into the corresponding tooth gap 74 of the drive belt 52.

The entrainment cams 54a, 54b, 56a and 56b arranged in pairs are disposed in a housing 58 which is fixed to the module carrier 16 and is furnished with opening slots 60. As can be seen in FIG. 5, the entrainment cams 54, 56 comprise an oblong hole which extends horizontally and in which a stud 64 fixed to the housing 58 engages. Spiral coiled springs 66 preloaded under pressure are disposed between the back wall of the housing 58 and the back side of the entrainment cams 54, 56, said springs pushing the entrainment cams 54, 56 away from the module carrier 16 in the direction of the toothed drive belt 52 (FIG. 5).

In an advantageous manner, the entrainment cams 54a, 54b, 56a and 56b are designed narrower than the tooth gap 74. If the entrainment cam 54a, 54b, 56a and 56b now projects into the tooth gap 74, play is then present between said entrainment cam 54a, 54b, 56a, 56b and the drive belt. This is correspondingly shown in FIGS. 10 and 11. Said entrainment cams 54a, 54b, 56a and 56b are preferably designed narrower than the tooth gap 74 in the region of the engagement area, i.e. in the foremost region. The narrower configuration has the advantage that said entrainment cam 54a, 54b, 56a and 56b cannot come to rest on a tooth when engaging in a tooth gap if said gap is not exactly met.

What is claimed is:

1. A device for transporting objects along a closed transport track, comprising, as the transport track, two tubular or rod-shaped guide rails (12, 14), which are arranged parallel to and vertically on top of each other, at least one transport module (10) which is connected to each guide rail (12, 14) via two support roll pairs (46, 48), each of the two support roll pairs (46, 48) engaging a different respective one of the guide rails (12, 14), wherein rolls of each support roll pair (46, 48) are rotatable about roll axes (a) which are substantially perpendicular to a guide rail axis (x) and include an angle of less than 180° and said rolls are seated against the guide rails (12, 14) in a detent position, and comprising a drive means (52) which is arranged so as to move substantially parallel to the guide rails (12, 14) and to connect to the at least one transport module (10), wherein the support roll pairs (46, 48) are non-positively seated against the guide rails (12, 14) via a force element (40), which acts on both of said support roll pairs (46, 48) and biases each of the support roll pairs against its respective guide rail (12, 14).

2. The device according to claim 1, wherein the roll axes (a) of the rolls of the support roll pairs (46, 48) include substantially an angle of 90°.

3. The device according to claim 1, wherein the support roll pairs (46, 48) on the transport module (10) are mounted in each case so as to rotate about axes ($y_1$, $y_2$) which are perpendicular to the guide rail axis (x) and parallel to a vertical axis (z).

4. The device according to claim 1, wherein the support roll pairs (46, 48) seated against differing guide rails (12, 14) are disposed between the guide rails (12, 14), the force exerted by the force element (40) on one of the support roll pairs (46, 48) being directed away from the force exerted by the force element (40) on the other support roll pair (46, 48).

5. The device according to claim 4, wherein the transport module (10) comprises a vertical module carrier (16) comprising support roll pairs (46, 48) which are arranged on two sides and are associated with two differing guide rails (12, 14).

6. The device according to claim 5, wherein each of the two support roll pairs (46, 48) associated with the two differing guide rails (12, 14) is connected via the force element (40).

7. The device according to claim 5, wherein the module carrier (16) comprises two carrier parts connected via a force element (40).

8. The device according to claim 1, wherein the guide rails (12, 14) are disposed between the support roll pairs (46, 48) seated against said guide rails (12, 14), the force exerted by the force element (40) on one of the support roll pairs (46, 48) being directed towards the force exerted by the force element (40) on the other support roll pair (46, 48).

9. The device according to claim 1, wherein at least one entrainment cam (54, 56) which is movable into engagement with the drive means (52) is disposed on the transport module (10).

10. The device according to claim 9, wherein the at least one entrainment cam (54, 56) is movable in relation to the transport module (10) substantially perpendicularly to the drive means (52) and is movable with at least one force element (66) into engagement with the drive means (52).

11. The device according to claim 9, wherein said resilient entrainment cams (54, 56) are arranged in pairs adjacent to one another.

12. The device according to claim 9, wherein respectively at least two entrainment cams (54a, 54b; 56a, 56b) are enabled per mesh point with the drive means (52).

13. The device according to claim 9, wherein the entrainment cams (54a, 54b; 56a, 56b) comprise a chamfer (78) in order to facilitate the positioning of the entrainment cam (54, 56) relative to the drive means (52).

14. The device according to claim 9, wherein the entrainment cams (54a, 54b; 56a, 56b) are designed narrower than a tooth gap (74) so that play is present in each case between entrainment cam (54a, 54b; 56a, 56b) and tooth when the entrainment cams (54a, 54b; 56a, 56b) project into the tooth gap (74), and as soon as both entrainment cams are correctly engaged, the position is fixed.

15. The device according to claim 9, wherein respectively exactly two entrainment cams (54a, 54b; 56a, 56b) are enabled per mesh point with the drive means (52).

16. The device according to claim 1, wherein a center ($Z_{zr}$) of the drive means (52) is offset with respect to a center ($Z_{Fs}$) of the guide rails (12, 14) by an amount (v) away from as curved segment (30) of a rotary conveyor (50).

17. The device according to claim 1, wherein the drive means is a toothed drive belt, wherein at least one resilient entrainment cam (54, 56) which is movable into engagement with the drive means (52) is disposed on the transport module (10).

18. The device according to claim 1, wherein a center ($Z_{Zr}$) of the drive means (52) is offset with respect to a center ($Z_{Fs}$) of the guide rails (12, 14) by an amount (v) away from a curved segment (30) of a rotary conveyor (50) that includes both the curved segment (30) and a linear segment (32), the offset being parallel to an angle bisector or central parallel of the linear segment (32).

19. The device according to claim 1, wherein the at least one transport module (10) is connected to each guide rail (12, 14) via four support roll pairs (46, 48), two of the support roller pairs (46, 48) engaging one of the guide rails (12) and the other two support roller pairs (46, 48) engaging the other guide rail (14), and wherein the four support roll pairs (46, 48) are non-positively seated against the guide rails (12, 14) via at least one force element (40) that biases the four support roll pairs against the guide rails (12, 14).

20. The device according to claim 19, wherein the four support roll pairs (46, 48) are non-positively seated against the guide rails (12, 14) via two force elements (40) that bias the four support roll pairs against the guide rails (12, 14).

21. A device for transporting objects along a closed transport track, comprising, as the transport track, two tubular or rod-shaped guide rails (12, 14), which are arranged parallel to and vertically on top of each other, at least one transport module (10) which is connected to each guide rail (12, 14) via support roll pairs (46, 48), wherein rolls of each support roll pair (46, 48) are rotatable about roll axes (a) which are substantially perpendicular to a guide rail axis (x) and include an angle of less than 180° and said rolls are seated against one of the guide rails (12, 14) in a detent position, and comprising a drive means (52) which is arranged so as to move substantially parallel to the guide rails (12, 14) and to connect to the at least one transport module (10), wherein the support roll pairs (46, 48) are non-positively seated against the guide rails (12, 14) via at least one force element (40), which acts on said support roll pairs (46, 48) and generates a directed force, and at least one of the support roll pairs (46, 48) seated against differing guide rails (12, 14) is movable out of the detent position with the guide rail (12, 14) against the acting direction of the force of the force element (40), wherein the support roll pairs (46, 48) on the transport module (10) are mounted in each case so as to rotate about axes ($y_1$, $y_2$) which are perpendicular to the guide rail axis (x) and parallel to a vertical axis (z), and wherein a center ($Z_{Zr}$) of the drive means (52) is offset with respect to a center ($Z_{Fs}$) of the guide rails (12, 14) by an amount (v) away from a curved segment (30) of a rotary conveyor (50).

22. The device according to claim 21, wherein the support roll pairs (46, 48) seated against differing guide rails (12, 14) are disposed between the guide rails (12, 14), the force exerted by the force element (40) on one of the support roll pairs (46, 48) being directed away from the force exerted by the force element (40) on the other support roll pair (46, 48).

23. The device according to claim 21, wherein the guide rails (12, 14) are disposed between the support roll pairs (46, 48) seated against said guide rails (12, 14), the force exerted by the force element (40) on one of the support roll pairs (46, 48) being directed towards the force exerted by the force element (40) on the other support roll pair (46, 48).

* * * * *